United States Patent Office 2,803,611
Patented Aug. 20, 1957

2,803,611

ADHESIVE

Raymond R. Lamm, Ambler, Pa., assignor to The Patent and Licensing Corporation, New York, N. Y., a corporation of Massachusetts No Drawing. Application September 24, 1954,
Serial No. 458,281

7 Claims. (Cl. 260—27)

This invention relates to a resinous composition, and is more particularly concerned with a resin-containing adhesive composition.

In the installation of wall and ceiling coverings such as acoustical tile, tile board and the like, adhesives are commonly employed for securing the coverings to the supporting surface. The method generally employed in acoustical tile installations, for example, involves applying daubs of the adhesive to the back of each tile, placing the tile against the ceiling or other surface to which it is to be bonded, and directing the tile into place by a sliding movement so as to spread the adhesive and unite the latter with the supporting surface and the back of the tile. Once the tiles have been directed into place their installation is considered to be complete and they are left without external supporting means to hold them in position while the adhesive dries. Adhesives employed for this purpose must, therefore, have high wet strength in order that the tiles will be held securely in place during the drying period while the solvent is evaporating from the adhesive mass.

From the applicator's viewpoint, on the other hand, it is important that the adhesive have a consistency which permits it to be scooped out of the container and daubed on the tile rapidly and with minimum effort. This requires an adhesive having "short-body" characteristics. An adhesive having a "long-body" or stringy consistency is difficult to handle and increases the time required for application. In adhesives heretofore known however, high wet strength and short body consistency have been found to be somewhat antagonistic or competing properties. Attempts made to improve the wet strength of tile adhesives have adversely affected the short body characteristics of the adhesives and improvements in the consistency of the material have been effected generally at the expense of wet strength. Tile adhesives heretofore made, therefore, have been based on a compromise between these two desirable but seemingly antagonistic properties.

In addition to short-body characteristics it is also important that acoustical tile adhesives have a suitable working viscosity. Adhesives adapted for tile installation inherently exhibit a relatively high viscosity.

To be practical, however, the adhesive must not be so viscous that it cannot readily be scooped out of the container with a trowel or knife and daubed on the back of the tile. Various types of adhesives have been proposed for use in securing acoustical tiles to ceilings, and are more or less satisfactory under certain temperature conditions. Such known adhesives, however, have the serious disadvantage of undergoing substantial changes in viscosity under the influence of temperature. These adhesives, for example, may have a satisfactory, workable consistency at about 70–85° F., but become so viscous at temperatures of 60° F. or below, that it is difficult to remove them from the containers and to daub them upon the tile, whereas at elevated temperatures of the order of about 100–115° F., they decrease in viscosity to such an extent that their wet strength is seriously impaired.

For example, when tiles are applied with conventional adhesives at ceiling temperatures of 100–115° F., which are frequently encountered in summer weather, particularly in the warmer parts of the country, failure of the adhesive and consequent falling or sagging of the tiles may occur unless lightweight tile is used, which is undesirable in many cases. The working temperature range of known acoustical tile adhesive is, therefore, very limited, and the disadvantage of this is obvious. If the adhesive is too cold, as for example when it has been exposed to low temperatures during shipment and storage, considerable time is required to heat the adhesive to a workable consistency, and on the other hand, when ceiling temperatures are above about 100–115° F., installation of acoustical tiles with these adhesives cannot be made with assurance that numerous failures may not result.

It is an object of this invention to provide an improved adhesive composition adapted for use in the installation of wall and ceiling coverings.

It is a further object of the invention to provide an adhesive composition of the character indicated having high wet strength and desirable consistency characteristics.

It is a still further object of the invention to provide an acoustical tile adhesive having optimum short body characteristics in combination with high wet strength, and a satisfactory working consistency over a wide range of temperatures.

Other objects and features of the invention will be apparent from the following detailed description:

According to the invention an adhesive composition is provided which comprises a brittle resinous binder, a volatile solvent and, as plasticizer for the resinous binder a polymerized acrylic ester and a hydrocarbon wax-naphthalene condensate. I have found that polymerized acrylic esters and hydrocarbon wax-naphthalene condensates are excellent plasticizers for brittle resinous materials, whether used as the sole plasticizers or in combination with other plasticizers, and further that adhesive compositions prepared with these materials as plasticizers exhibit high wet strength, short-body characteristics, and a stable viscosity over a wide temperature range. I have found, for example, that when a composition is made from a brittle resinous binder, a volatile solvent, a filler such as clay and, as plasticizer for the resinous binder, a mixture of a polymerized acrylic ester and a hydrocarbon wax-naphthalene condensate, there is obtained a highly effective acoustical tile adhesive with excellent wet strength, a short-body, non-stringy consistency and a viscosity which undergoes little change between temperatures of 60° F. and 115° F. Indeed, the adhesive is of workable consistency at temperatures as low as 35° F. This composition may, therefore be applied at relatively low temperatures without the necessity of preparatory heating and retains its wet strength and short-body characteristics at the highest temperatures which are normally encountered in service. The polymerized acrylic ester and the paraffin wax-naphthalene condensate combine to impart a combination of desirable properties to the adhesive while at the same time effectively plasticizing the resinous constituent.

The polymerized acrylic esters which I employ in the adhesive compositions of my invention are the polymers or copolymers of the aliphatic esters of acrylic or methacrylic acid. These polymers are generally made by treating the appropriate monomer or mixture of monomers in the presence of a suitable polymerization catalyst. In preparing my compositions I employ the polymerized acrylic esters per se or in the form of solutions. The acrylic esters which are suitable in my compositions are those which are soluble in hydrocarbon solvents such as petroleum solvents e. g. V. M. and P naphtha, Stoddard solvent, aromatic solvents such as toluene coal-tar naphthas and the like. The acrylic esters are polymerized to produce polymers of various degrees of polymerization and the higher polymers are then "cut-back" with an appropriate solvent to the desired viscosity. For example, a solution of a given desired viscosity may be obtained by preparing a hydrocarbon-soluble polymer of a relatively high degree of polymerization and then cutting it back with the necessary quantity of solvent, or a polymer of the desired viscosity may be prepared directly by controlling the degree of polymerization. I prefer to use a polymerized acrylic ester composition having a viscosity at 100° F. within the range of about 4000 to 6500 centistokes, although compositions having viscosities somewhat below or above this range are suitable. I have found particularly effective a polymerized acrylic ester product of the above-described type marketed under the trade designation Acryloid #710 which is a copolymer lauryl and hexyl methacrylate in a 40% solution of 150 sec. solvent refined lubricating oil. This material is soluble in hydrocarbon solvents and has a viscosity of 5200 centistokes at 100° F. a specific gravity of 0.89 at 60° F., a pour point of +20° F. and a neutralization value of 0.3.

The hydrocarbon wax-naphthalene condensate which I employ in the adhesive compositions of my invention is the product obtained by the condensation of chlorinated paraffin wax and naphthalene in the presence of cataylsts of the Freidel-Crafts type, e. g., aluminum chloride. The condensation is generally effected in the presence of a solvent such as kerosene. After the reaction has taken place, the catalytic sludge is withdrawn, the solvent and unreacted constituents removed by distillation and the hydrocarbon wax-naphthalene condensate recovered as the residual product. The paraffin wax-naphthalene condensate, a commercial form of which is sold under the trade name "Paraflow" is a viscous liquid with a flash point above 450° F. and a specific gravity at 60° F. of about 0.9. Other plasticizers may be used in addition to the paraffin wax-naphthalene condensate and the polymerized acrylic ester such as, for example, pine oil, mineral oil derivatives and the like. When such supplementary plasticizers are used however, I prefer that they represent a relatively small proportion of the plasticizer mixture. I have found that whereas the paraffin wax naphthalene condensate and the polymerized acrylic ester supplement each other and permit the desirable properties of each to be utilized, substantial amounts of pine oil hydrocarbon oils, and like plasticizers have an adverse effect upon the plasticizer mixture.

The brittle resinous materials employed in my improved adhesive are preferably natural resins or resinous derivatives thereof such as rosin, dammar, kauri, batu, limed rosin, heat-treated rosin, natural resin esters, e. g. ester gum and the like. I have found limed rosin, heat-treated rosin, or mixtures thereof particularly suitable as components of adhesives made according to my invention.

The solvent component of my adhesive is any relatively volatile organic solvent for the resinous material. Especially suitable are solvents of the hydrocarbon type such as petroleum naphtha, aromatic solvents and the like. I have found particularly effective, for example, a petroleum hydrocarbon fraction having a boiling range of about 300° to 375° F. Mixtures of hydrocarbon solvents and small amounts of other solvents such as alcohol or acetone are advantageously employed, as for example, when gum rosin, soda-treated rosin, copal, or the like are contained in the resin component.

A filler is advantageously added to the adhesive mixture to impart desirable short-body characteristics. Clay is particularly effective for this purpose, although other fillers such as asbestos, whiting, diatomaceous earth and slate flour are suitably employed. When clay is used as the filler, small amounts of water may be added for the purpose of increasing the effectiveness of the clay. It is a feature of the invention that substantial quantities of filler may be added to the adhesive composition to give it excellent short-body properties without reducing the desirable high wet strength. Thus in accordance with my invention I am able to provide an adhesive having a combination of properties which permit it to be quickly and easily applied and to serve as an effective and efficient bonding agent.

The proportions of the various components forming the adhesives of the invention may be varied over a substantial range and satisfactory results obtained. For example, the amount of the polymerized acrylic ester component and paraffin-wax-naphthalene condensate used may be from 5 to 100 parts per 100 parts of the brittle resinous material. Preferably, I use about 25 parts of the polymerized acrylic ester and paraffin wax-naphthalene condensate to 100 parts of the resinous component. For example, I have obtained particularly good results using a mixture of about 45% of polymerized acrylic ester component and 55% paraffin wax-naphthalene condensate and employing this plasticizer mixture in an amount corresponding to about 25 parts of the mixture per 100 parts of the resinous material. The proportion of resinous material will, of course, vary but for best results in an acoustical tile cement, it should represent about 25 to 40% of the total composition, preferably about 30%. The filler preferably varies from about 1 part to 2 parts per part of resin, although up to 3 parts may satisfactorily be used depending upon the type of filler. When using clay, for example, not more than about 2 parts are needed to provide desired short-body properties to the product.

The quantity of solvent used depends upon the nature of the resinous component contained in the adhesive and is used in the quantities necessary to bring the adhesive to the desired viscosity at normal temperatures.

In preparing adhesives embodying my invention, the ingredients may be mixed at room temperatures or at higher temperatures, i. e., temperatures above the melting point of the resin. For example, the resinous material in pulverized form may be incorporated with the solvent and the polymerized acrylic ester solution and the paraffin wax-naphthalene condensate, or the resinous material may be added in molten form. The final viscosity of the product is adjusted by addition of small quantities of solvent.

The following specific example of an acoustical tile adhesive formulation is further illustrative of the invention. In the example, proportions of the ingredients are expressed in parts by weight:

| | Parts |
|---|---|
| Limed rosin | 14 |
| Paraffin-wax naphthalene condensate | 2 |
| Polymerized acrylic ester (copolymer of lauryl and hexyl methacrylate 40% sol. in oil) | 1½ |
| Solvent | 6 |
| Clay | 24 |
| Water | 1 |

The solvent employed is a paraffinic petroleum fraction having a boiling range of 300–375° F. This adhesive had desirable short body characteristics when tested with a spatula and had high wet strength. The wet strength of the product was tested by the following procedure:

The test sample is made by cutting a circular disk (2¾ inches in diameter) from a piece of acoustical tile or ⅜ inch thick gypsum board. A small hole is made in the center of the disk and a string is placed through the hole and tied to a 3 d. finish nail laid across the hole. A hook for attaching the test load is provided at the free end of the string. The base to which the test sample is secured by the adhesive being tested is a ⅜ inch gypsum board. A dab of the adhesive about 2¾ inches in diameter is applied to the undersurface of the base and the circular disk is then pressed against the adhesive in such a way that a vertical space of ½ inch is left between the lower surface of the base and the upper surface of the circular disk. The base is then placed in a horizontal position with a circular disk downwardly in a constant temperature oven maintained at a temperature of 130° F. Within 2 minutes a load of ½ pound is attached to the supporting arm or hook hanging from the circular disk. The test assembly is left in the oven for 24 hours and then inspected. An adhesive which does not fail during the 24 hour period has high wet strength. The adhesive material according to the above formulation embodying my invention exhibited no failure when subjected to this test.

For purposes of comparison a commercial acoustical tile cement similar in composition to the adhesive of the example but containing an oil plasticizer for the resinous component was subjected to the above-described test. This adhesive failed to pass the test.

The viscosity of the adhesive prepared in the example was measured at 60° F., 80° F. and 115° F. with a MacMichael viscosimeter using a #18 wire, a large inner cup and a 1 cm. plunger at the fourth level. The readings were taken after 1 minute. As a standard for comparison viscosity measurements at these three temperatures were also made on a sample of the commercial acoustical tile cement used in the wet-strength test above. The results of these measurements are tabulated below.

| Material Tested | MacMichael Viscosity | | |
| --- | --- | --- | --- |
| | At 60° F. | At 80° F. | At 115° F. |
| Composition of Example | 87 | 75 | 73 |
| Commercial Acoustical Cement | Above 120 | 80 | 35 |

From the foregoing it will be seen that the combination of a paraffin wax-naphthalene condensate and a polymerized acrylic ester as plasticizer for the resinous component produce an adhesive composition which exhibits high wet strength and only a slight change in viscosity at temperatures of from 60° F. to 115° F. which is the temperature range normally encountered in the installation of acoustical tile, tile board and the like.

This application is a continuation-in-part of my copending application Serial No. 96,156, filed May 28, 1949, now abandoned.

I claim:

1. An adhesive composition comprising a resinous material selected from the group consisting of natural resins and resinous derivatives of natural resins, a plasticizer for said resinous material comprising a mixture of an ester selected from the group consisting of the polymers of the aliphatic esters of acrylic and methacrylic acid and the copolymers of the aliphatic esters of acrylic acid with the aliphatic esters of methacrylic acid and a paraffin wax-naphthalene condensate and a volatile solvent, said adhesive composition containing from 5 to 100 parts by weight of said plasticizer per 100 parts of said resinous material and said polymerized acrylic ester being oil-soluble and having a viscosity in the range 4000–6500 centistokes at 100° F.

2. An adhesive composition comprising a resinous material selected from the group consisting of natural resins and resinous derivatives of natural resins, a plasticizer for said resinous material comprising a mixture of an ester selected from the group consisting of the polymers of the aliphatic esters of acrylic and methacrylic acid and the copolymers of the aliphatic esters of acrylic acid with the aliphatic esters of methacrylic acid and a paraffin wax-naphthalene condensate and a volatile solvent, said adhesive composition containing from 25% to 40% by weight of natural resinous material and from 5 to 100 parts by weight of said plasticizer per 100 parts of said resinous material and said polymerized acrylic ester being oil-soluble and having a viscosity in the range 4000–6500 centistokes at 100° F.

3. An adhesive composition containing 25% to 40% by weight of a resinous material selected from the group consisting of natural resins and resinous derivatives of natural resins, a plasticizer for said resinous material comprising a mixture of an ester selected from the group consisting of polymers of the aliphatic esters of acrylic and methacrylic acid and the copolymers of the aliphatic esters of acrylic acid with the aliphatic esters of methacrylic acid and a paraffin wax-naphthalene condensate, a filler, and an amount of volatile solvent such that the adhesive composition at room temperature has a consistency which permits it to be applied readily, said adhesive composition containing per 100 parts by weight of said resinous material from 5 to 100 parts of said plasticizer and from 100 to 300 parts of said filler and said polymerized acrylic ester being oil-soluble and having a viscosity in the range 4000–6500 centistokes at 100° F.

4. An adhesive composition comprising limed rosin binder, a plasticizer for said binder comprising a mixture of an ester selected from the group consisting of the polymers of the aliphatic esters of acrylic and methacrylic acid and the copolymers of the aliphatic esters of acrylic acid with the aliphatic esters of methacrylic acid and a paraffin wax-naphthalene condensate, and a volatile hydrocarbon solvent, said adhesive composition containing per 100 parts by weight of said limed rosin from 5 to 100 parts of said plasticizer and said polymerized acrylic ester being oil-soluble and having a viscosity in the range 4000–6500 centistokes of 100° F.

5. An adhesive composition adapted for adhesively securing acoustical tiles and the like and characterized by a substantially constant viscosity in the temperature range 60° F. to 115° F. and high wet strength, comprising limed rosin binder, a plasticizer for said binder comprising a mixture of an ester selected from the group consisting of polymers of the aliphatic esters of acrylic and methacrylic acid and the copolymers of the aliphatic esters of acrylic acid with the aliphatic esters of methacrylic acid and a paraffin wax-naphthalene condensate, a filler, and a volatile hydrocarbon solvent, said adhesive composition containing per 100 parts of weight of said binder, from 5 to 100 parts of said plasticizer and from 100 to 300 parts of said filler and said polymerized acrylic ester being oil-soluble and having a viscosity in the range 4000–6500 centistokes at 100° F.

6. An adhesive composition adapted for adhesively securing acoustical tiles and the like and characterized by a substantially constant viscosity in the temperature range 60° F. to 115° F. and high wet strength, comprising limed rosin binder, a plasticizer for said binder comprising a mixture of an ester selected from the group consisting of polymers of the aliphatic esters of acrylic and methacrylic acid and the copolymers of the aliphatic esters of acrylic acid with the aliphatic esters of methacrylic acid and a paraffin wax-naphthalene condensate, a filler and a volatile hydrocarbon solvent, said adhesive compisition containing from 25% to 40% by weight of said binder and per 100 parts by weight of said binder about 25 parts of said plasticizer and not more than about 300 parts of said filler and said polymerized acrylic ester being oil-soluble and having a viscosity in the range 4000–6500 centistokes at 100° F.

7. An adhesive composition adapted for adhesively securing acoustical tiles and the like and characterized by a substantially constant viscosity in the temperature range 60° F. to 115° F. and high wet strength, comprising limed rosin binder, a plasticizer for said binder comprising a mixture of an ester selected from the group consisting of the polymers of the aliphatic esters of acrylic and methacrylic acid and the copolymers of the aliphatic esters of acrylic acid with the aliphatic esters of methacrylic acid and a paraffin wax-naphthalene condensate for said binder, said polymerized acrylic ester having a viscosity at 100° F. within the range of about 4,000 to 6,500 centistokes and said ester being mixed with said paraffin wax-naphthalene condensate in the proportion of about 45% of said ester to about 55% of said condensate, a clay filler and a volatile hydrocarbon solvent, said adhesive composition containing from 25% to 40% by weight of said binder and per 100 parts by weight of said binder about 25 parts of said plasticizer and not more than about 200 parts of said clay filler and said polymerized acrylic ester being oil-soluble and having a viscosity in the range 4000–6500 centistokes at 100° F.

No references cited.